March 16, 1943.                J. A. CAMPBELL                 2,313,920
                                GAUGE STRIP
                            Filed April 16, 1941
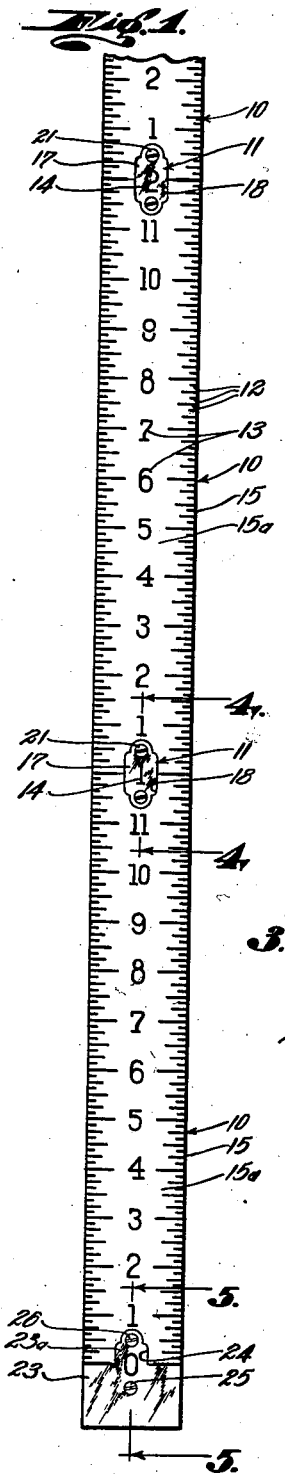
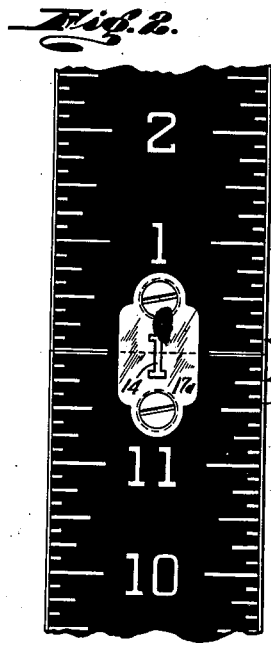
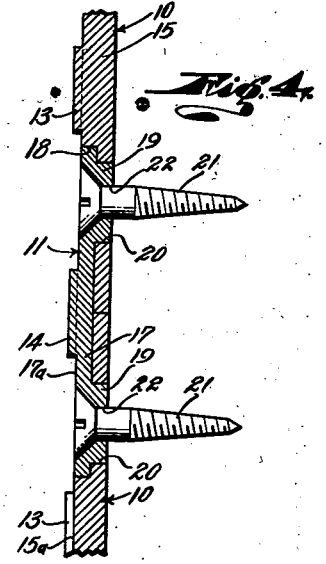
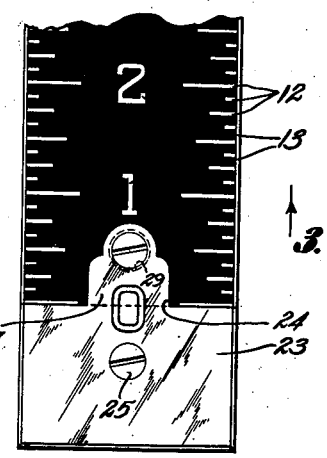
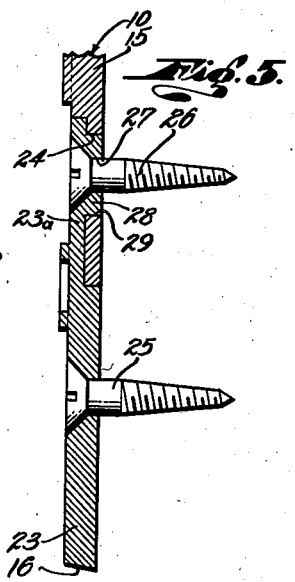
Inventor
JULIAN A. CAMPBELL
Attorney Patented Mar. 16, 1943

2,313,920

UNITED STATES PATENT OFFICE 2,313,920

GAUGE STRIP

Julian A. Campbell, Long Beach, Calif.

Application April 16, 1941, Serial No. 388,903

8 Claims. (Cl. 33—111)

This invention has to do with improvements in gauge strips or markers of the type used in conjunction with liquid level indicators to show the liquid level in containers such as oil tanks and the like, or for stream or reservoir gauging. Frequently these strips are mounted on a support and the assembly fastened to the tank or container so that the usual float cable passes down the center of the gauge strip, or parallel thereto, and the gauge is read opposite the position of an indicator carried by the cable.

Gauge strips and other kinds of gauge markers heretofore used have had their limitations and objectionable features, for such reasons as their poor visibility, at least under most conditions, also their lack of durability, of warp resistance, of clarity after exposure for considerable time to the weather, and especially their susceptibility to the action of corrosive gases and vapors about oil and chemical plants. As a result, their readings are often troublesome and inaccurate, and in most if not all instances of which I am aware, they have required refinishing or replacement after being in service for some length of time.

In accordance with the invention I have provided a greatly improved gauge strip characterized by its clarity of reading, ease of assembly and application to its support. This gauge strip is further characterized by its ability to retain not only its shape and dimensions, but also its original appearance as well as contrast between the scale graduations and numerals, and their background, after indefinite exposure of the strip to the most severe weather conditions, or to ordinarily corrosive or reactive acidic or alkaline fluids. For the purpose of retaining the dimensions of the strip and assuring it against warpage, I preferably use a metallic base strip of suitable composition adaptable to electroplating. Various zinc-aluminum alloys are particularly satisfactory. This base strip is coated with a layer or plate which preferably is dark, or substantially black in color, so that the graduations and numerals may be highlighted to appear in distinct relief against the dark background. The surface layer or plate also is made to have effective and permanent resistance to attack by oxidation or corrosive chemicals that would deleteriously affect paint or other surface coatings. Exceptional results have been obtained by electroplating the zinc alloy base with a molybdenous layer, such as that deposited from the Du Pont Company molybdenum and nickel electroplating salts now available on the market (under the trade-name "Moly-Black") and adapted to deposit a black plate. Raised numerals and graduations on the strip may be brought out in clear relief against the black background by grinding their surfaces to expose the relatively bright zinc alloy of the strip base.

Other important features of the invention have to do with the construction of the gauge strip in sectional form, and the connections between the adjacent ends of successive sections. For this purpose I may employ a novel form of plate interlock between adjacent sections, which may serve the several purposes of interconnecting the sections, facilitating their attachment to a support, and as carriers for gauge markings, e. g. foot numerals, where the individual sections are in one foot lengths. To improve the suitability of the interlocks as markers, they are desirably made of bright metal so as to appear distinctively and clearly against the black surfaces of the strip sections.

The details of a typical and illustrative form of sectional gauge strip embodying the invention will be understood from the description to follow. Throughout the course of the description reference is had to the accompanying drawing, in which:

Fig. 1 is a general showing of the assembled gauge strip and including, as illustrative, the two bottom sections and their interlocks;

Fig. 2 is a fragmentary enlargement of portions of the strip assembly, the raised numerals and graduations on the strip sections being shown highlighted against the black molybdenum plate;

Fig. 3 is a cross-section on line 3—3 of Fig. 2; and

Figs. 4 and 5 are enlarged fragmentary sections on lines 4—4 and 5—5, respectively, of Fig. 1.

Referring first to Fig. 1, the strip assembly comprises a series of individual sections 10 in end-to-end relation and connected by interlocks 11 which, as will presently appear, may desirably serve also as foot length markers. Each strip section 10 has raised graduations 12 and numerals 13, both of which may be applied to any suitable scale, for example according to either the engineer's or architect's scales. As typically illustrated, each section 10 is one foot in length and the numerals and graduations represent inch markings, and fractions thereof. As further shown, the interlock plates 11 carry raised numerals 14 to indicate foot lengths on the strip assembly.

Each section 10 comprises an elongated flat strip 15 having slightly beveled edges 16 and made preferably of a metal or alloy suitable for the application of the aforementioned "Moly-Black" type of plate. Typically the strip 15 may be die-cast from one of various zinc base die-casting metals or alloys, and which may also contain aluminum or magnesium, or both. For example, the strip sections may be die-cast under pressure from a metallic alloy containing around 95% zinc, 4% aluminum, and 1% copper.

These die-cast zinc alloy strips are electroplated in a bath or solution of the "Moly-Black" salts, to coat the strips with an intensely black plate which, as mentioned above, is highly resistant to discoloring, oxidation, corrosion, and attack by acidic or alkaline fluids. Thereafter, the surfaces of the graduations 12 and numerals 13 are ground or polished through the molybdenous plate to expose the comparatively bright-colored zinc alloy, leaving the markings and numerals appearing in highlighted contrast to the black background.

The foot marker interlocks 11 preferably are formed as relatively small plate inserts 17 fitted into correspondingly shaped recesses 18 cast in the faces of the strip sections so that the surfaces 17a and 15a of the foot marker plates and strip sections lie in the same plane. Lugs 19 on plate 17 project within corresponding openings 20 in the strip sections to hold the latter against longitudinal parting movement. At each joint, the foot marker plate and abutting ends of the strip sections are secured to the gauge support, not shown, by screws 21 inserted through openings 22 in the thickened end portions 19 of the plate. It will be noted that the plate inserts 17 serve not only to hold the strip sections against longitudinal parting movement, but that they also retain the strip sections in accurate alinement and hold them against any relative lateral movement, whether bodily or tilting.

The bottom of the gauge strip may be held in place by foot plate 23 having an upper portion 23a retained within a correspondingly shaped recess 24 in the bottom strip section. Plate 23 is secured to the strip support by screws 25 and 26, the latter being inserted at 27 through the thickened portion 28 of the plate received within an opening 29 in the strip 15.

The foot marker plates 17 and the bottom plate 23 preferably are bright-plated of nickel or chromium, to enhance their appearance and relief against the black surface of the strip sections. By reason of the contrast, reading of the foot markers as well as the strip numerals and graduations, is greatly facilitated.

While for many purposes it is preferred to coat the gauge strip proper with a black molybdenous plate as described, and to employ bright metal foot marker interlocks, I have found that a reverse color contrast between the strip sections and interlocks may be effectively used and preferred in some instances. For example, the die-cast zinc alloy strip sections may be bright-plated with chromium or nickel, and the foot marker interlocks 11 made of similar alloy or metal capable of taking the "Moly-Black" plate. It is preferred to first sand-blast the zinc alloy strip sections 10, and then chromium plate them to give a velvety or non-lustrous surface. The faces of the numerals and graduations then may be ground smooth to make them appear in relief against the sand-blasted surface of the strip. After applying the molybdenous plate to the foot marker interlocks, the raised numerals or their faces may be ground through the plate to expose the relatively bright metal of the base alloy.

I claim:

1. The combination comprising a pair of elongated gauge strip sections alined in end-to-end relation and having series of numbered lineal graduations, a plate element interconnecting the ends of said sections and set within recesses in the graduated surfaces thereof, and means carried by said element holding said sections against longitudinal movement apart, said element having an opening to receive a screw to be inserted through the element and beyond the strip sections into a support.

2. The combination comprising a pair of elongated gauge strip sections alined in end-to-end relation and having series of numbered lineal graduations, a plate element interconnecting the ends of said sections and set within recesses in the graduated surfaces thereof, said element having openings to receive screws to be inserted through the element and beyond said sections for attachment of the strip sections to a supporting structure.

3. The combination comprising a pair of gauze strip sections in end-to-end relation and having series of numbered graduations, and an element interconnecting the ends of said sections and set within recesses in the graduated surfaces thereof, portions of said element extending through openings in said sections and said portions of the element having openings to receive screws for attachment of the strip sections to a supporting structure.

4. The combination comprising a pair of elongated gauge strip sections alined in end-to-end relation and having on their outer surfaces a series of raised lineal graduations, and a flat plate element interconnecting the ends of said sections and set within recesses in the graduated surfaces thereof so that the surface of said element is substantially flush with said surfaces of the sections, said element having openings to receive screws to be inserted through the element and beyond said sections for attachment of the strip sections to a supporting structure.

5. The combination comprising a pair of elongated gauge strip sections alined in end-to-end relation and having on their outer surfaces series of numbered lineal graduations, and an element interconnecting the ends of said sections and having portions projecting within openings in said sections to hold them against endwise movement apart, and means projecting beyond the inner surfaces of said sections for attaching said element to a supporting structure.

6. The combination comprising a pair of elongated gauge strip sections alined in end-to-end relation and having on their outer surfaces series of numbered lineal graduations, a plate element interconnecting the ends of said sections to hold them against longitudinal movement apart, and means projecting beyond the inner surfaces of said sections for attaching said element and sections to a support, said element having indicated thereon a foot marking numeral, and said strip sections and element having distinctively different colors.

7. The combination comprising a pair of elongated gauge strip sections alined in end-to-end relation and having on their outer surfaces series of numbered lineal graduations, a plate element interconnecting the ends of said sections and set within recesses in the graduated surfaces thereof, and means for attaching said element to a support beyond the inner surfaces of said sections, said element having a substantially black surface carrying a highlighted numeral, and the graduated surfaces of said strip sections having a bright metal finish.

8. The combination comprising a pair of elongated gauge strip sections alined in end-to-end relation, said sections each comprising a substantially black strip carrying highlighted lineal graduations, and numerals on its outer surface, a numbered bright metal foot marking plate interconnecting the ends of said sections, and means for attaching said plate and strip sections to a supporting structure beyond the inner surfaces of said sections.

JULIAN A. CAMPBELL.